United States Patent [19]

Meredith

[11] Patent Number: 5,675,794
[45] Date of Patent: Oct. 7, 1997

[54] METHOD AND APPARATUS FOR CONFIGURING MULTIPLE AGENTS IN A COMPUTER SYSTEM

[75] Inventor: Susan S. Meredith, Hillsboro, Oreg.

[73] Assignee: Intel Corporation, Santa Clara, Calif.

[21] Appl. No.: 618,665

[22] Filed: Mar. 20, 1996

Related U.S. Application Data

[63] Continuation of Ser. No. 245,362, May 18, 1994, abandoned.

[51] Int. Cl.$^6$ .................................................. G06F 13/362
[52] U.S. Cl. .......................... 395/651; 395/284; 395/828
[58] Field of Search ............................. 395/700, 284, 395/183.12, 651, 828, 830

[56] References Cited

U.S. PATENT DOCUMENTS

| | | | |
|---|---|---|---|
| 4,940,909 | 7/1990 | Mulder et al. | 307/465 |
| 4,985,830 | 1/1991 | Atac et al. | 395/200.15 |
| 5,247,659 | 9/1993 | Curran et al. | 395/575 |
| 5,247,682 | 9/1993 | Kondou et al. | 395/700 |
| 5,247,683 | 9/1993 | Holmes et al. | 395/700 |
| 5,263,148 | 11/1993 | Jones, Jr. et al. | 395/700 |
| 5,280,627 | 1/1994 | Flaherty et al. | 395/700 |
| 5,515,516 | 5/1996 | Fisch et al. | 395/294 |

OTHER PUBLICATIONS

Val Popescu, et al., "The Metaflow Architecture", Jun. 1991, IEEE Micro, pp. 10–13 and 63–73.

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

An apparatus for configuring multiple agents in a computer system includes a first storage device for storing a set of configuration values and a second storage device for capturing the set of configuration values from the bus. These configuration values are driven onto the bus and retrieved from the bus by interface logic within the apparatus. The interface logic drives the configuration values onto the bus when a register within the apparatus is activated. At system power-on, the first storage device defaults to a first set of values. These values are then driven onto the bus and retrieved by each agent on the bus, including the apparatus of the present invention. This first set of values provides the system with the necessary parameters to access and execute certain initialization program(s). These initialization programs can modify the configuration values stored in the first storage device. After the initialization program(s) modify the first storage device, they activate a register within the apparatus of the present invention. This register causes interface logic to drive the values stored in the first storage device onto the system bus. Each agent on the bus, including the apparatus of the present invention, retrieves these values. The apparatus of the present invention stores these values in a second storage device and proceeds to operate according to the values in the second storage device.

20 Claims, 5 Drawing Sheets

METHOD AND APPARATUS FOR CONFIGURING MULTIPLE AGENTS IN A COMPUTER SYSTEM

This is a continuation of application Ser. No. 08/245,362, filed May 18, 1994 now abandoned.

BACKGROUND OF THE INVENTION

1. Field of the Invention

The present invention pertains to computer systems. More particularly, this invention relates to jumperless configuration of multiple agents within a computer system.

2. Background

Modern computer systems frequently include multiple agents coupled to a system bus. These agents may include such devices as microprocessors, memory devices, input/output (I/O) devices, etc. In order for the computer system to function properly, these agents must operate together in performing their respective tasks.

One way of ensuring that the agents in a computer system operate together is to establish a set of configuration values. These configuration values generally include items which all agents must agree on, such as error checking protocols. Thus, the agents in a system function together properly when these configuration values are the same for each agent in the system.

In addition to requiring agreement among the agents on the configuration values, all agents should reach agreement at the same time for certain configuration values. For example, one common configuration value defines the error checking protocol for transfers over the system bus; if agreement is not reached on this protocol then a target agent would not be able to indicate to a source agent that an error occurred. Furthermore, each agent should reach agreement on the error checking protocol at the same time; if agreement is not reached at the same time, then a period of time exists during which agents are using different error checking protocols. During this time period agents cannot properly indicate errors to one another.

One common way of establishing these configuration values (i.e., those which all agents must agree on at the same time) is to set a jumper on each agent. Using jumpers, each agent in the system has a set of pins accessible to the system user. By connecting the proper combination of pins with a jumper(s), the system user is able to set the proper configuration values for that agent. By placing the jumper(s) properly on each agent, the system user is able to set these configuration values to be the same for each agent. Thus, when the system powers-up, each agent has the appropriate configuration values and they are all set at the same time (i.e., at system power-up).

In order to change the configuration values for a particular agent the user must change the setting of the jumper. Thus, to alter the configuration values for all agents on the bus typically requires physical manipulation of every jumper on every agent. Furthermore, the jumpers typically must be changed while the system is turned off. Although it may be physically possible to change jumpers while the system is operating, such an action would not result in all values being changed at the same time. In addition, changing jumpers while the system is operating could cause unpredictable system behavior.

In addition, the use of jumpers increases the cost of the system in two ways. First, the existence of pins and jumpers are an additional material and manufacturing cost. Second, the manufacturer spends time configuring the system (i.e., placing the jumpers), which adds to the cost. Although this second cost may not exist if the end user rather than the manufacturer configures the system, requiring such action by the user increases user inconvenience.

As the performance of modern computer systems is continually increasing, the uses for computer systems are also continually expanding. Thus, it would be beneficial to provide a system which could be easily modified to accommodate a wide variety of applications and uses. In order to change uses, however, the configuration values stored in the system may need to be modified. Therefore, it would be beneficial to provide a system which would allow a system user to easily modify the configuration values to accommodate different uses. The present invention provides such a solution.

In addition, in some fields the use or a computer system may need to be modified during system operation. In such a situation, the configuration values may need to be changed. Thus, it would be beneficial to provide a system which would allow its configuration values to be quickly and easily changed during system operation. The present invention provides such a solution.

SUMMARY OF THE INVENTION

The present invention comprises a method and apparatus for configuring multiple agents in a computer system.

In one embodiment, the computer system includes a bus and an apparatus having a first storage device for storing a set of configuration values. The configuration values are driven onto the bus by interface logic within the apparatus. The apparatus also includes a second storage device for capturing the set of configuration values from the bus. The interface logic drives the configuration values onto the bus when a register within the apparatus is activated.

At system power-on, the first storage device defaults to a first set of values. These values are then driven onto the bus and captured by each agent on the bus. This first set of values provides the system with the necessary parameters to access and execute certain initialization program(s). These initialization program(s) can modify the configuration values stored in the first storage device and thereby set up the first storage device with the desired configuration values for the system.

After the initialization program(s) modify the first storage device, a register within the apparatus of the present invention is activated. This register causes interface logic to drive the values stored in the first storage device onto the system bus. Each agent on the bus, including the apparatus of the present invention, captures these values. The apparatus of the present invention stores these values in the second storage device and proceeds to operate according to the values in the second storage device.

Subsequent changes to the configuration values for the system can be made during system operation by software. These changes are accomplished by modifying the values in the first storage device. Once modification is complete, the software activates the appropriate register within the apparatus, thereby causing all agents on the bus to capture the new configuration values from the bus.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
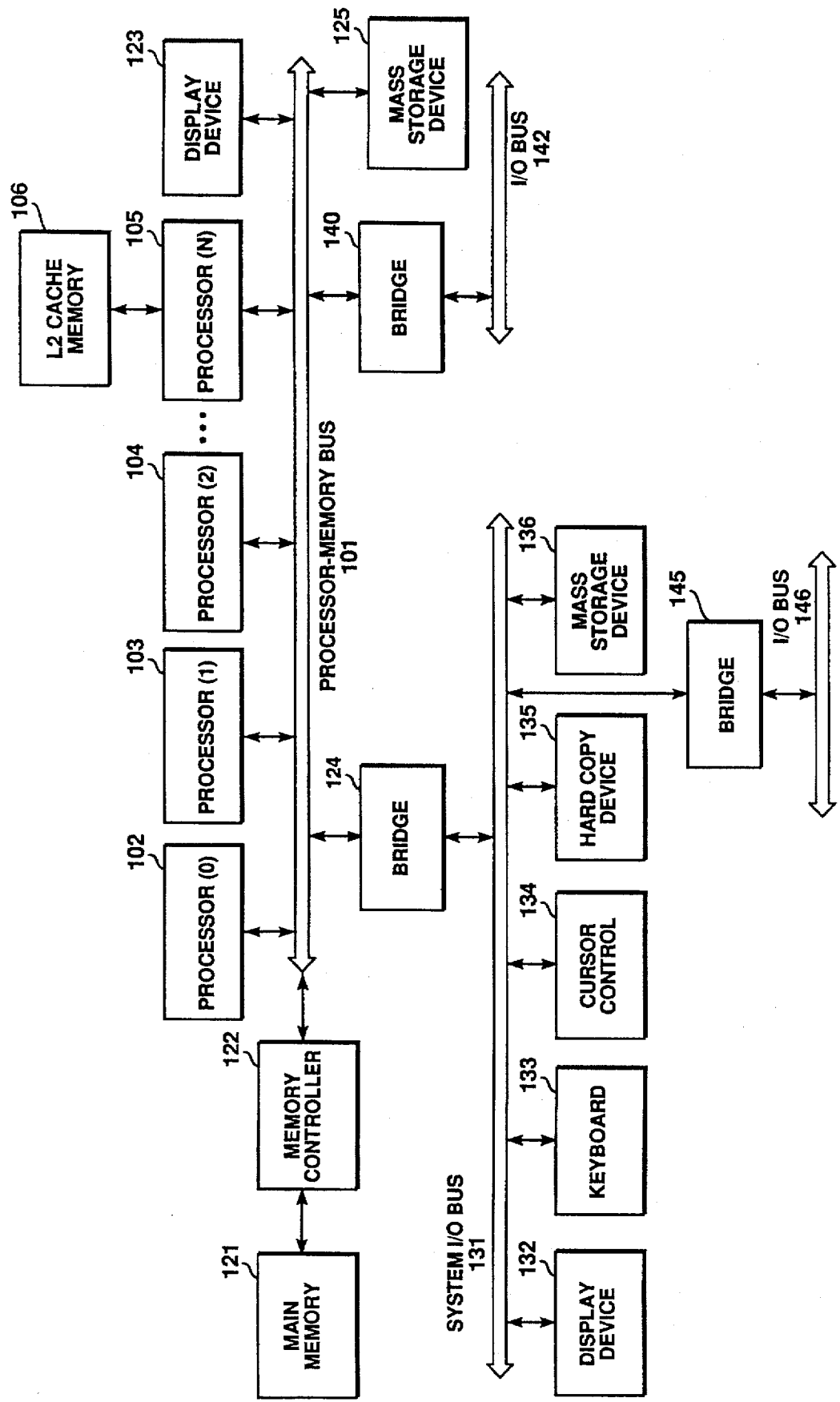
FIG. 1 shows an overview of an exemplary multiprocessor computer system of the present invention.

FIG. 1 shows an overview of an example multiprocessor computer system of the present invention. The computer system generally comprises a processor-memory bus or other communication means 101 for communicating information between one or more processors 102, 103, 104 and 105. Processor-memory bus 101 includes address, data and control buses. Processors 102 through 105 may include a small, extremely fast internal cache memory, commonly referred to as a local (L1) cache memory for temporarily storing data and instructions on-chip. In addition, a bigger, slower secondary (L2) cache memory 106 can be coupled to a processor, such as processor 105, for temporarily storing data and instructions for use by processor 105. In one mode, the present invention includes Intel® architecture microprocessors as processors 102 through 105; however, the present invention may utilize any type of microprocessor architecture, or any of a host of digital signal processors.

Processor 102, 103, and 104 comprise a parallel processor, such as a processor similar to or the same as processor 105. Alternatively, processor 102, 103, or 104 comprise a co-processor, such as a digital signal processor. In addition, processors 102 through 105 may include processors of different types.

The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to processor-memory bus 101.

An input/output (I/O) bridge 124 may be coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

I/O bus 131 communicates information between peripheral devices in the computer system. Devices that may be coupled to system bus 131 include a display device 132, such as a cathode ray tube, liquid crystal display, etc., an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system bus 131.

In addition, an I/O bus 142 may be coupled to processor-memory bus 201 via bridge 140. I/O bus 142 may be coupled to additional peripheral devices, such as devices 132 through 136 coupled to system I/O bus 131.

In one embodiment of the present invention I/O bus 146 is coupled to system I/O bus 131 via bridge 145. I/O bus may be coupled to additional peripheral devices, such as devices 132 through 136 coupled to system I/O bus 131. In one mode, I/O bus 146 operates on a different standard (e.g., EISA) than system I/O bus 131 (e.g., PCI).

In certain implementations, it may not be required to provide a display device for displaying information. Certain implementations of the present invention may include additional processors or other components. Additionally, certain implementations of the present invention may not require nor include all of the above components. For example, processors 102 through 104, display device 123, I/O bus 142, or mass storage device 125 may not be coupled to processor-memory bus 101. Furthermore, some of the peripheral devices shown coupled to system I/O bus 131 may be coupled to processor-memory bus 101; in addition, in some implementations only a single bus exists with the processors 102 through 105, memory controller 122, and peripheral devices 132 through 136 coupled to the single bus.

Figure 2:
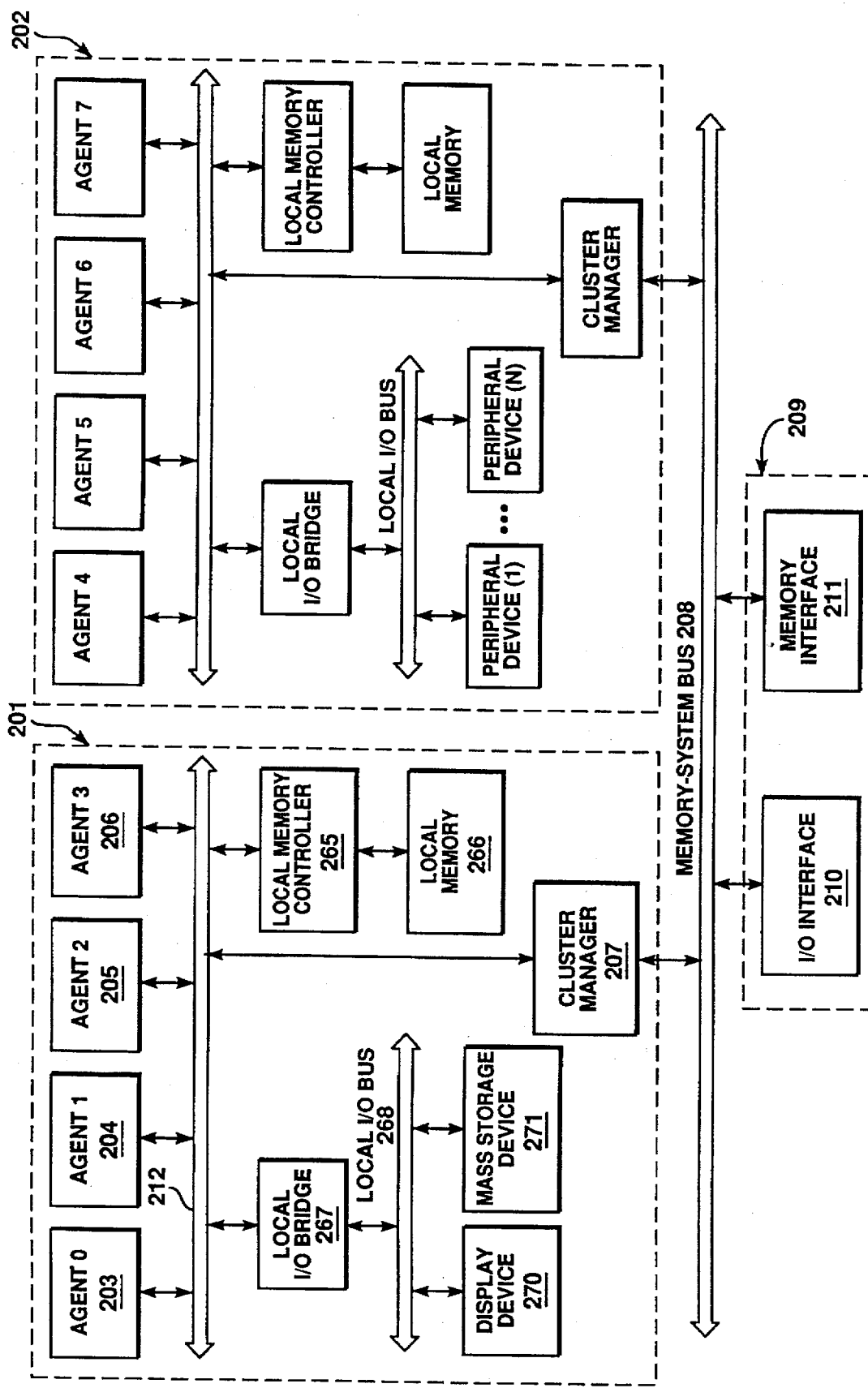
FIG. 2 is a block diagram showing an exemplary bus cluster system of the present invention.

FIG. 2 is a block diagram showing an exemplary bus cluster system of the present invention. The present invention can apply to multiprocessor computer systems having one or more clusters of processors. FIG. 2 shows two such clusters 201 and 202. Each of these clusters are comprised of a number of agents. For example, cluster 201 is comprised of four agents 203–206 and a cluster manager 207, which may include another cache memory (not shown), coupled to bus 212. Agents 203–206 can include microprocessors, co-processors, digital signal processors, etc.; for example, agents 203 through 206 may be the same as processor 105 shown in FIG. 1. Cluster manager 207 and its cache are shared between these four agents 203–206. Each cluster is coupled to a memory-system bus 208, which in one embodiment is processor-memory bus 101 of FIG. 1. These clusters 201–202 are coupled to various other components of the computer system through a system interface 209. The system interface 209 includes an I/O interface 210 for interfacing the computer system to the outside world and a memory interface 211 which provides access to a main memory, such as a DRAM memory array. In one embodiment, I/O interface 210 is bridge 124 of FIG. 1, and memory interface 211 is memory controller 122 of FIG. 1.

In one embodiment, each cluster also includes a local memory controller and/or a local I/O bridge. For example, cluster 201 may include a local memory controller 265 coupled to processor bus 212. Local memory controller 265 manages accesses to a RAM or other local memory device 266 contained within cluster 201. Cluster 201 may also include a local I/O bridge 267 coupled to processor bus 212. Local I/O bridge 267 manages accesses to I/O devices within the cluster, such as a display device 270 or mass storage device 271 coupled to local I/O bus 268. In one mode, each cluster 201 and 202 includes a local I/O bridge coupled to a local I/O bus which is coupled to peripheral devices 132 through 136 shown in FIG. 1.

Certain implementations of the present invention may not require nor include all of the above components. For example, cluster 201 or 202 may comprise fewer than four agents. Additionally, certain implementations of the present invention may include additional processors or other components.

In one embodiment of the present invention, the computer systems of FIGS. 1 and 2 are personal computer systems. These systems may be, for example, desktop or portable computer systems.

Figure 3:
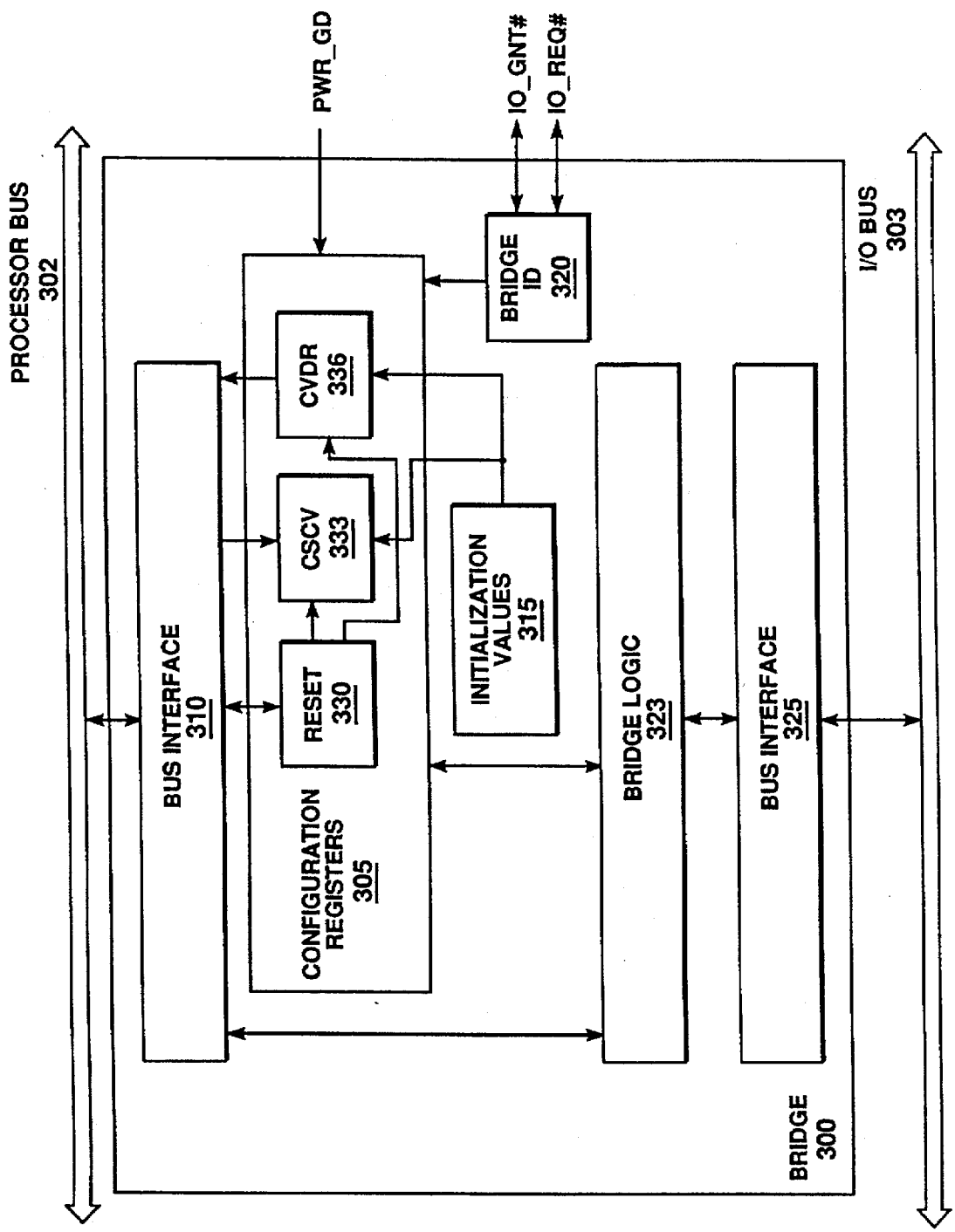
FIG. 3 is a block diagram showing the apparatus of one embodiment of the present invention.

FIG. 3 is a block diagram showing the apparatus of one embodiment of the present invention. A bridge 300 is shown comprising configuration registers 305, bus interface 310, initialization values 315, bridge ID 320, bridge logic 323 and bus interface 325. Bridge 300 is coupled to processor bus 302 via interface 310 and I/O bus 303 via interface 325. Both bus 302 and bus 303 comprise an address bus, data bus, and control bus, as is well-known in the art. In one embodiment, bridge 300 is bridge 124 of FIG. 1. In an alternate embodiment, bridge 300 is I/O interface 210 of FIG. 2.

In the discussion and examples to follow, the present invention is described incorporated within a bus bridge. It should be readily apparent to those skilled in the art, however, that the present invention applies equally to any other agent coupled to the bus within the computer system. In addition, in one mode of operation the present invention comprises its own stand-alone device on the bus.

Bus interface 325 transfers address, data, and control signals between I/O bus 303 and bridge logic 323 in a conventional manner. Similarly, bus interface 310 transfers address, data, and control signals between processor bus 302 and bridge logic 323 in a conventional manner. Bridge logic 323 is the internal control logic for bridge 300. Bridge logic 323 operates in a conventional manner to transfer requests between processor bus 302 and I/O bus 303.

Bus interface 310 also transfers address, data, and control signals between processor bus 302 and configuration registers 305. The transferring of such signals between a bus and an agent residing on the bus is well-known in the art and thus will not be described further.

Configuration registers 305 comprise three devices: a reset register 330, a Captured System Configuration Values (CSCV) register 333, and a Configuration Values Driven on Reset (CVDR) register 336. It should be noted that although configuration registers 305 are discussed as being registers, any other conventional storage devices may be used. In one embodiment of the present invention, reset register 330 is one bit of an 8-bit register, and both CSCV register 333 and CVDR register 336 are 16-bit registers. CSCV register 333 contains the set of configuration values used by bridge 300 to define its own operation. For example, the In-Order Queue depth used by bridge 300 is determined by the configuration values stored in CSCV register 333. In one mode, all agents coupled to processor bus 302 contain a CSCV register 333, or its equivalent, with a bus interface which retrieves the configuration values from the bus. As in bridge 300, the CSCV registers 333 in other agents are used by those agents to define their own operation. Thus, by changing the values in the CSCV registers 333 of all other agents in the system, the configuration values for all agents are changed.

Table 1 shows the configuration values stored in CSCV register in one embodiment of the present invention.

TABLE 1

| Bit | Function |
| --- | --- |
| 15:14 | Reserved |
| 13 | Output Tristate Enabled. This bit indicates whether the processors will tristate their outputs. When this bit is set, the processors tristate their outputs. If this bit is not set, then the processors do not tristate their outputs. |
| 12:11 | Advanced Programmable Interrupt Controller (APIC) Cluster ID. These bits indicate the APIC cluster ID for the processors coupled to the bus. |
| 10 | Report BINIT input. This bit indicates whether BINIT logic is enabled. If this bit is set, then an agent asserts a BINIT# signal if it detects a bus condition that prevents reliable future information. If this bit is not set, then all agents on the bus, except for a central agent, ignore the assertion of the BINIT# signal. |
| 9 | Report BERR input. This bit indicates whether BERR# reporting is enabled. When |

TABLE 1-continued

| Bit | Function |
|---|---|
|  | this bit is set BERR# signal is asserted by an agent which detects an unrecoverable error without a bus protocol violation. If this bit is not set, then agents on the bus will not assert a BERR# signal. |
| 8 | Address Bus Error Reporting using AERR#. This bit indicates whether address parity reporting using the AERR# signal is enabled. When this bit is set, assertion of an AERR# signal indicates an address parity error. If this bit is not set, then all agents on the bus, except for a central agent, ignore the assertion of an AERR# signal. |
| 7 | In-Order Queue Depth 1. This bit indicates the in-order queue depth for agents on the bus. The in-order queue depth is the number of transactions which can be outstanding on the pipelined processor bus. When this bit is sea, the queue depth is one. If this bit is not set, then the queue depth is eight. |
| 6 | 1M Power-on Reset Vector. This bit indicates the proper reset vector on which the processors begin execution after reset. When this bit is set, the reset vector is 0FFFF0H (1 Meg - 16). If this bit is not set, then the reset vector is 0FFFFFFF0H (4Gig - 16). |
| 5 | Functional Redundancy Checking (FRC) Mode Enable. When this bit is set, the system operates in FRC mode. If this bit is not set, then the system does not operate in FRC mode. |
| 4:0 | Reserved |

CVDR register 336 is initially programmed at power-on with a set of default configuration values. These default values are initialization values 315. In one embodiment of the present invention, initialization values 315 are a minimum set of configuration values necessary for the system to function at a minimum level. By providing a minimum set of values, the computer system is able to function properly, albeit perhaps not at the optimal level for its intended use. However, once a minimal set of values is established, the configuration registers can be re-programmed with a new set of parameters, as described in more detail below.

In one embodiment, the initialization values 315 are predetermined in the system. That is, the system is pre-configured to power-up with particular initialization values. These initialization values may be predetermined in any of a wide variety of conventional manners, such as being hardwired into the system.

The initialization values 315 are also input to CSCV register 333 at power-on. Thus, both CSCV register 333 and CVDR register 336 contain the same set of values initially (i.e., initialization values 315). As described in more detail below, these values may change during system operation.

Table 2 shows the initialization values 315 and the corresponding CVDR bits and functions in one embodiment of the present invention. In locations where a bit is either set or not set, a "1" indicates the bit is set and "0" indicates the bit is not set.

TABLE 2

| Bit | Function | Initial Value |
|---|---|---|
| 15:14 | Reserved | N/A |
| 13 | Output Tristate Enabled. | 0 |
| 12:11 | APIC Cluster ID. | 00 |
| 10 | Report BINIT input. | 0 |
| 9 | Report BERR input. | 0 |
| 8 | Address Bus Error Reporting using AERR#. | 0 |
| 7 | In-Order Queue Depth 1. | 0 |
| 6 | 1M Power-on Reset Vector. | 0 |
| 5 | FRC Mode Enable. | 0 |
| 4:0 | Reserved | N/A |

Bus interface 310 drives the values contained in CVDR register 336 onto processor bus 302 when reset register 330 is activated. In one mode, these values are driven over the address bus of bus 302. In one embodiment, reset register 330 is activated by being written to by software. Activation of reset register 330 also causes bus interface 310 to assert a PROC_RESET# signal over bus 302. In one mode, the PROC_RESET# signal is part of the control bus of bus 302.

The PROC_RESET# signal is received by all agents coupled to processor bus 302 and causes them to perform a "reset" operation, including bridge 300. The reset operation includes retrieving the configuration values from the bus and storing these values in a configuration register(s) equivalent to CSCV register 333. Each agent then uses these new values in performing all subsequent transactions on the bus.

In addition to driving the values in CVDR register 336 onto bus 302, bus interface 310 also stores the values in CSCV register 333. This enables bridge 300 to update its own configuration values along with all other agents on the bus.

Figure 4:
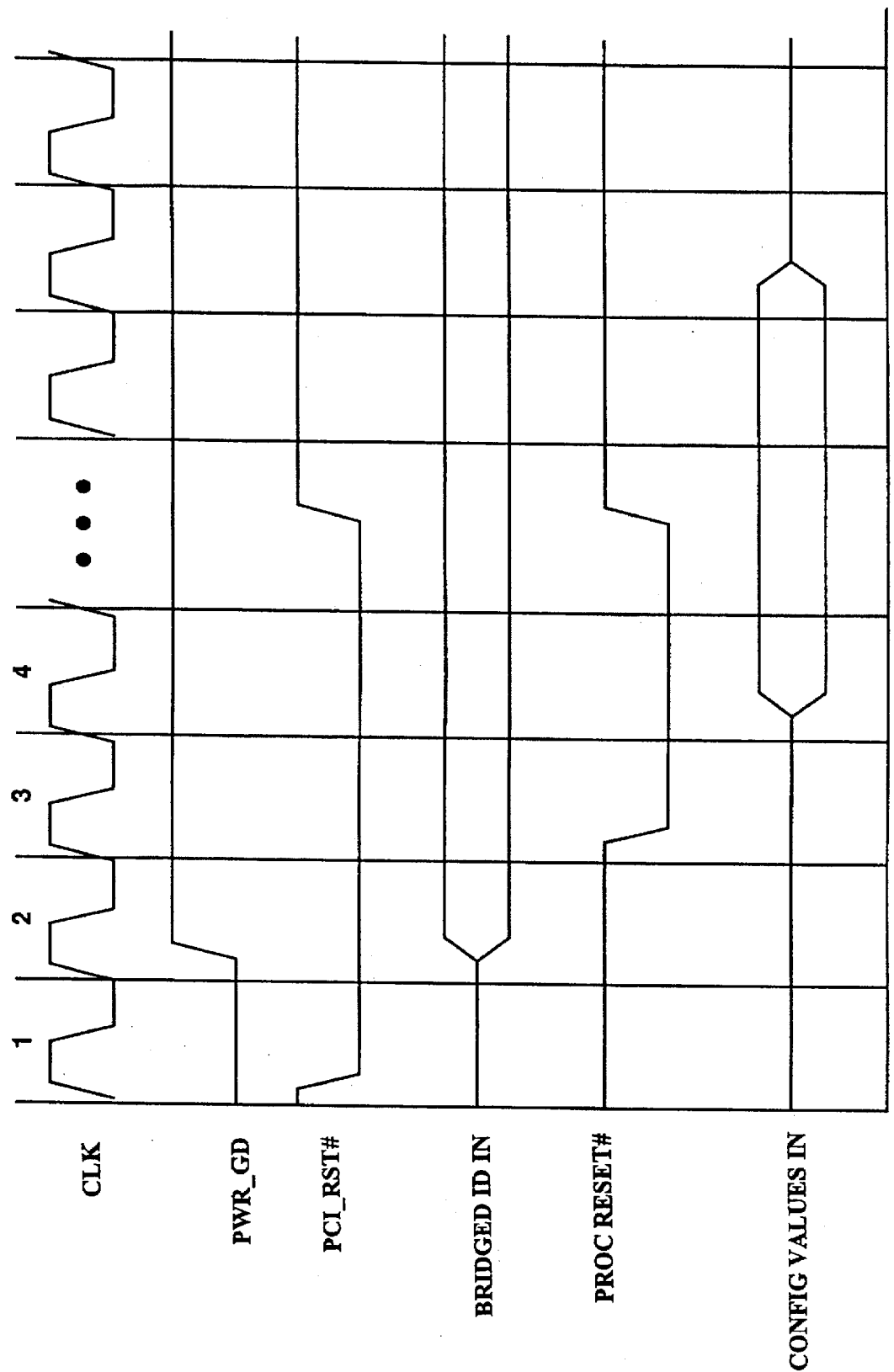
FIG. 4 shows a timing diagram for driving initial configuration values in one embodiment of the present invention.

FIG. 4 shows an example timing diagram for driving initial configuration values in one embodiment of the present invention. In this embodiment, I/O bus 303 operates on the well-known PCI standard. As shown in FIG. 3, a PWR_GD signal is input to CVDR register 336. PWR_GD is a signal generated by the power supply of the computer system. In one mode, the power supply asserts the PWR_GD signal after all voltages within the power supply are stable for one millisecond. As shown in FIG. 4, the PWR_GD signal is input to bridge 300 asynchronously.

In one embodiment, bridge 300 resets the I/O bus 303 by asserting a PCI_RST# signal. In one mode, the PCI_RST# signal is asserted whenever PWR_GD is detected deasserted. The PCI_RST# signal remains asserted until one millisecond after PWR_GD is asserted. In this mode, all other agents on I/O bus 303 reset themselves when PCI_RST# transitions from zero to one.

On the rising edge of PWR_GD bridge 300 captures its bridge ID, which is bridge ID 320 in FIG. 3. This is shown as Bridge ID In of FIG. 4. In one embodiment, bridge 300 maintains the same bridge ID while the system is operating; that is, the PROC_RESET# signal does not alter the bridge ID. The bridge ID is used to determine which bridge should drive the configuration values onto the bus in a system containing multiple bridges, as discussed in more detail below.

Also on the rising edge of PWR_GD, initialization values 315 are written to CSCV register 333 and CVDR register 336. This provides CVDR register 336 with the proper configuration values to drive onto bus 302, described below.

Once PWR_GD is received, bridge 300 resets processor bus 302, with the PROC_RESET# signal. PROC_RESET# is asserted synchronously at the clock after PWR_GD transitions from zero to one. Thus, as shown in FIG. 4, PWR_GD is asserted asynchronously in CLK2, and PROC_RESET# is asserted in CLK3. In one embodiment of the present invention, PROC_RESET# is held asserted for one millisecond.

The configuration values from CVDR register 336 are driven onto processor bus 302 while PROC_RESET# is asserted. The bridge 300 asserts the configuration values after determining it is the "compatibility bridge"; the compatibility bridge is the bridge responsible for configuring the system, as described in more detail below. These values are shown as Config Values In of FIG. 4 and are retrieved by each agent on bus 302 on the rising edge of PROC_RESET#. Thus, after PROC_RESET# is deasserted, all agents coupled to bus 302 contain the same configuration values.

FIG. 4 shows the driving of initial configuration values from system power-on. Other resets may also be performed under certain predetermined conditions after system power-on. For example, a physical reset switch may be actuated by the system user. Under such conditions, the PROC_RESET# signal is asserted upon actuation of the reset switch, and the values in the CVDR register 336 are driven onto the bus, as described above.

In one embodiment, the actuation of a physical reset switch causes the initialization values 315 to be loaded into CVDR register 336. In an alternate mode, initialization values 315 are not loaded into CVDR register 336. In this alternate mode, the configuration values stored in CVDR register 336 at the time the reset switch is actuated are driven onto bus 302.

In one embodiment of the present invention, the system can also be reset by writing to reset register 330. In this embodiment, the PROC_RESET# signal and Config Values In are asserted as shown in FIG. 4. The initialization values 315 do not replace the values stored in CVDR register 336; whatever configuration values are stored in CVDR register 336 at the time the reset register 330 is written to are the values which are driven onto the bus.

Thus, it can be seen that new configuration values can be stored in the CVDR register 336 and subsequently driven onto the bus during a reset. This reset is controlled by writing to reset register 330.

As shown in FIGS. 1 and 2, a computer system may comprise more than one bus bridge. In one embodiment, each bridge is identical to bridge 300 of FIG. 3. Thus, each bridge contains configuration registers 305. In order for multiple bridges to function properly in this embodiment, only one bridge should be allowed to reset the processor bus. Whether a bridge is allowed to reset the processor bus is determined by the bridge ID 320.

In one embodiment, bridge ID 320 is a two-bit value which is established at system power-on. Bridge ID 320 is determined by the IO_GNT# and IO_REQ# signals, which are driven as Bridge ID In of FIG. 4. In one mode, the IO_GNT# and IO_REQ# signals are also used by bridge 300 in arbitration for processor bus 302 after system power-on. The IO_GNT# and IO_REQ# signals are fixed either high or low at power-on, thereby indicating either a one or a zero. This can be done in any of a wide variety of conventional manners, such as by utilizing pull-up/pull-down resistors or jumpers.

By fixing the proper IO_GNT# and IO_REQ# signals high or low for each bridge it is seen that four unique bridge ID's can be generated. It should be understood by those skilled in the art that any number of unique bridge ID's can be provided given the proper number of input signals.

The bridge ID is used to determine which bridge of multiple bridges is responsible for resetting the bus; the bridge responsible for resetting the bus is termed the "compatibility bridge." In one embodiment, each bridge predetermines that the bridge with a particular bridge ID is the compatibility bridge. In one mode, the compatibility bridge ID is "01", comprising a "0" from the IO_GNT# signal and a "1" from the IO_REQ# signal.

Upon receipt of the PWR_GD signal, each bridge begins assertion of the PROC_RESET# signal, as shown in FIG. 4. Thus, when multiple bridges exist in the system, each one is asserting a PROC_RESET# signal. Each bridge, however, is also receiving the signals indicating its bridge ID. If a bridge determines it is the compatibility bridge, it continues to assert the PROC_RESET# signal and also drives the values in its CVDR register 336 onto the bus, as described above. However, if a bridge determines it is not the compatibility bridge, then the bridge deasserts its PROC_RESET# signal. These non-compatibility bridges do not drive the values in their CVDR registers onto the bus. Rather, these bridges behave as any other agent coupled to the bus; i.e., these bridges capture their configuration values from the bus on the rising edge of PROC_RESET#.

It should be noted that the bridge ID for each bridge in a multiple bridge system determines which bridge is the compatibility bridge. Thus, the bridge ID only determines which bridge is responsible for resetting the bus, and which bridge can drive its CVDR register onto the bus. Which bridge performs these functions does not affect the system's ability to modify configuration values in all agents by modifying the CVDR register of the compatibility bridge.

In a multiple bridge system, the CVDR register 336 of the compatibility bridge can be written to by other agents in the system (as well as the compatibility bridge itself). In order to do so, an agent issues a command which targets the compatibility bridge (by targeting the compatibility bridge bridge ID). Since each bridge has a unique bridge ID, and the bridge ID of the compatibility bridge is predetermined, other agents in the system can properly target the CVDR register 336 of the compatibility bridge.

Although specific details on establishing a Bridge ID for each bridge in a multiple bridge system are given above, these details are not meant to limit the scope of the present invention. The Bridge ID can be determined in any of a wide variety of conventional manners.

Figure 5:
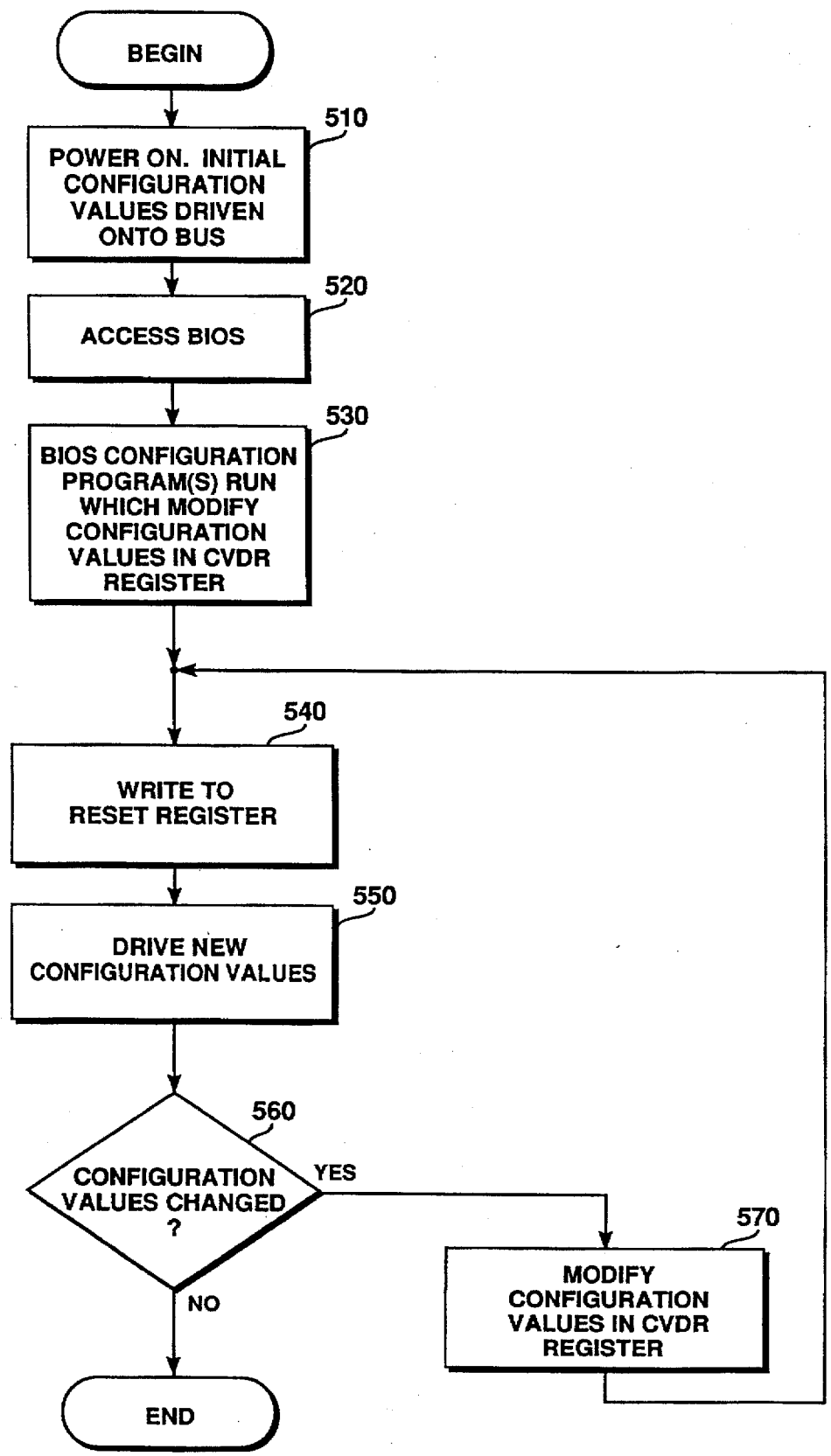
FIG. 5 is a flowchart showing the steps for updating agent configuration values in one embodiment of the present invention.

The steps for updating configuration values according to one embodiment of the present invention are shown in FIG. 5. Initially, the computer system is powered-on and initial configuration values are driven onto the bus, step 510. This is done as shown above in FIG. 4.

Given the initial configuration values, the agents on processor bus 302 have the necessary parameters to allow them to access the system Basic Input Output System (BIOS), step 520. In one mode, the BIOS is stored in a peripheral device coupled to bus 303, such as a mass storage device. Alternatively, the BIOS could be stored in a device coupled to bus 302, such as a Read-Only Memory (ROM) or other mass storage device coupled to bus 302.

Regardless of the location of the BIOS, the initial configuration values allow the agents on the bus to access the BIOS. The BIOS generally contains a set of software programs which are executed by the processor(s) on the bus at system startup, as is well-known in the art. In one embodiment, these BIOS programs modify the configuration values of CVDR register 336 in bridge 300 of FIG. 3, step 530.

Upon completion of modifying the values in CVDR register 336, the BIOS programs perform a write to reset register 330, step 540. As discussed above, this causes bus interface 310 to drive the values in CVDR register 336 onto bus 302, step 550. The agents on the bus subsequently retrieve and store these values and operate according to them.

The configuration values may be changed again during system operation, as shown by step 560. If no further modifications are made, then no further configuration values are driven onto the bus. However, subsequent software programs could modify the configuration values in the CVDR register, step 570. As discussed above, modifying the values in the CVDR register does not alter the configuration values for the system, including bridge 300, until the reset register 330 is written to. After modifying CVDR register 336, the software repeats steps 540 and 550; i.e., the software writes to reset register 330, causing the new configuration values in CVDR register 336 to be driven onto the bus.

This modification of configuration values can continue for the duration of system operation, as shown by step 560. Any time software desires to modify the system configuration values, the CVDR register can be modified and the values driven onto the bus.

Thus, it can be seen that the configuration values used by each agent in the system are updated at the same time through the use of the reset register 330, CSCV register 333, and CVDR register 336. These configuration values can be changed any number of times during system operation by re-programming the proper registers; no physical manipulation of jumpers or similar devices is required.

It should be noted that although the above description discusses modifying and driving a set of configuration values, the present invention is not limited to such values. It should be understood by those skilled in the art that the present invention applies equally to any of a wide variety of values which may be set in a computer system.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for configuring multiple agents in a computer system has been described.

What is claimed is:

1. An apparatus for configuring a plurality of agents in a computer system with a plurality of configuration values, wherein the computer system includes a bus coupled to the plurality of agents, and wherein said apparatus comprises:

a first storage device which stores said plurality of configuration values;

interface logic for driving said plurality of configuration values from said first storage device onto said bus for retrieval and storage by each of the plurality of agents in order to configure a plurality of different operating parameters in each of said plurality of agents, and controlling the modification of said first storage device during operation of said apparatus;

a second storage device which stores said plurality of configuration values, wherein the apparatus uses said plurality of configuration values stored in said second storage device to define a plurality of operating parameters for the apparatus; and a first register for determining when said interface logic drives said plurality of configuration values from said first storage device onto said bus, and determining when said second storage device stores said plurality of configuration values.

2. The apparatus as defined in claim 1, wherein said interface logic is also for storing said plurality of configuration values in said second storage device when driving said set of values onto said bus.

3. The apparatus as defined in claim 1 wherein said first storage device and said second storage device comprise a second register and a third register, respectively.

4. The apparatus as defined in claim 1, wherein said interface logic drives said plurality of configuration values onto said bus when said first register is written to.

5. The apparatus as defined in claim 1, wherein each agent of said plurality of agents is a processor.

6. The apparatus as defined in claim 1, wherein said interface logic is also for asserting a reset signal to said plurality of agents, said reset signal indicating to each of said plurality of agents when to retrieve and store said plurality of configuration values.

7. A method for simultaneously configuring a plurality of agents in a computer system with a first plurality of configuration values, wherein the computer system includes a bus coupled to the plurality of agents, said method comprising the steps of:

(a) driving a second plurality of configuration values onto said bus;

(b) accessing, according to the second plurality of configuration values, a first storage device to determine said first plurality of configuration values, wherein said first plurality of configuration values are different than the second plurality of configuration values;

(c) storing said first plurality of configuration values in a second storage device;

(d) driving said first plurality of configuration values from the second storage device onto said bus;

(e) retrieving, by each of said plurality of agents simultaneously, said first plurality of configuration values; and (f) storing, by each of said plurality of agents simultaneously, said first plurality of configuration values to simultaneously define a plurality of different operating parameters for each of said plurality of agents.

8. The method as defined in claim 7, wherein said accessing step (b) comprises the step of determining a method for accessing said first storage device based on said second plurality of configuration values.

9. The method as defined in claim 7, wherein said driving step (d) comprises the step of activating a register causing said first plurality of configuration values to be driven onto said bus.

10. The method as defined in claim 9 wherein said step of activating a register comprises the step of writing to said register.

11. The method as defined in claim 7, wherein said retrieving step (e) comprises each of said plurality of agents retrieving said first plurality of configuration values in a same clock cycle.

12. The method as defined in claim 7, further comprising the step of driving a reset signal onto said bus concurrently with said first plurality of configuration values, and wherein each of said plurality of agents retrieves and stores said first plurality of configuration values responsive to the reset signal.

13. A computer system comprising:

a first bus;

a second bus;

a first plurality of agents coupled to said first bus;

a second plurality of agents coupled to said second bus; and a first agent being both one of said first plurality of agents and one of said second plurality of agents, wherein said first agent includes,
 a first storage device which stores a plurality of configuration values,
 interface logic for driving said plurality of configuration values from said first storage device onto said second bus for retrieval and storage by each of said second plurality of agents to configure a plurality of different operating parameters in each of said plurality of agents, and for controlling the modification of said first storage device during operation of said first agent,
 a second storage device which stores said plurality of configuration values, wherein said first agent uses said plurality of configuration values stored in said second storage device to define a plurality of operating parameters for said first agent, and
 a first register for determining when said interface logic drives said plurality of configuration values from said first storage device onto said second bus, and determining when said second storage device stores said plurality of configuration values.

14. The computer system as defined in claim 13, wherein a second agent of said second plurality of agents includes a third storage device which stores said plurality of configuration values from said bus.

15. The computer system as defined in claim 13, wherein a second agent of said second plurality of agents includes logic for retrieving a second plurality of configuration values from a third agent of said first plurality of agents according to said first plurality of configuration value.

16. The system as defined in claim 13, wherein said first agent is a bus bridge and wherein each of said second plurality of agents is a microprocessor.

17. The computer system as defined in claim 13, wherein said interface logic is also for driving a reset signal on said second bus, said reset signal indicating to each of said second plurality of agents when to retrieve and store said plurality of configuration values.

18. An apparatus for configuring a plurality of agents in a computer system with a plurality of configuration values, wherein the computer system includes a bus coupled to the plurality of agents, said apparatus comprising:

a first storage device which stores said plurality of configuration values;

a means for driving said plurality of configuration values from said first storage device onto said bus for retrieval and storage by each of the plurality of agents in order to configure a plurality of different operating parameters in each of said plurality of agents;

a means for controlling the modifying of said first storage device during operation of said apparatus;

a second storage device which stores said plurality of configuration values after said means for driving said plurality of configuration values onto said bus drives said plurality of configuration values onto said bus, wherein the apparatus uses said plurality of configuration values stored in said second storage device to define a plurality of operating parameters for the apparatus; and a means for determining when said means for driving drives said plurality of configuration values onto said bus and when said second storage device stores said plurality of configuration values.

19. The apparatus as defined in claim 18, wherein said means for driving further comprises means for storing said plurality of configuration values in said second storage device.

20. The apparatus as defined in claim 18, wherein said means for driving drives said plurality of configuration values onto said bus when said means for determining is written to.

* * * * *